United States Patent
Oswalt

(12) 
(10) Patent No.: US 6,929,181 B1
(45) Date of Patent: Aug. 16, 2005

(54) DATE SPECIFIC PACKAGE DELIVERY SYSTEM

(76) Inventor: Richard E. Oswalt, P.O. Box 221, Basehor, KS (US) 66007

( * ) Notice: Subject to any disclaimer, the term of this patent is extended or adjusted under 35 U.S.C. 154(b) by 54 days.

(21) Appl. No.: 09/625,472

(22) Filed: Jul. 25, 2000

(51) Int. Cl.$^7$ .............................................. G06F 17/60
(52) U.S. Cl. ............................ 235/385; 235/375; 705/8
(58) Field of Search ................................ 235/375, 376, 235/377, 383, 384, 385; 705/1, 7–8, 11, 22, 28

(56) References Cited

U.S. PATENT DOCUMENTS

| | | | |
|---|---|---|---|
| 5,038,283 A | * | 8/1991 | Caveney |
| 5,117,096 A | * | 5/1992 | Bauer et al. |
| 5,249,687 A | | 10/1993 | Rosenbaum et al. |
| 5,434,394 A | | 7/1995 | Roach et al. |
| 5,465,291 A | * | 11/1995 | Barrus et al. |
| 5,470,427 A | | 11/1995 | Mikel et al. |
| 5,554,842 A | | 9/1996 | Connell et al. |
| 5,586,036 A | | 12/1996 | Pintsov |
| 5,684,705 A | | 11/1997 | Herbert |
| 5,790,429 A | | 8/1998 | Baker et al. |
| 5,809,479 A | | 9/1998 | Martin et al. |
| 5,960,408 A | * | 9/1999 | Martin et al. .................. 705/11 |
| 5,960,412 A | | 9/1999 | Tackbary et al. |
| 5,971,587 A | | 10/1999 | Kato et al. |
| 6,021,942 A | | 2/2000 | Monico |
| 6,029,140 A | | 2/2000 | Martin et al. |
| 6,182,053 B1 | * | 1/2001 | Rauber et al. |
| 6,285,916 B1 | * | 9/2001 | Kadaba et al. |
| 2002/0049622 A1 | * | 4/2002 | Lettich et al. .................. 705/7 |
| 2002/0194057 A1 | * | 12/2002 | Lidow .......................... 705/10 |

OTHER PUBLICATIONS

Tom Peters; Journal Record: New Book Details One–to–one Marketing Revolution; Jan. 20, 1994.*

Copy of excerpt from printed publication by Don Peppers and Martha Rogers entitled The One–to–One Future: Share of Customer, Not Share of Market; (Judy Pistkus Ltd, 1994): (front cover sheet, biography page, table of contents, and Chapter 2, pp. 18–50).

* cited by examiner

Primary Examiner—Diane I. Lee
(74) Attorney, Agent, or Firm—Hovey Williams LLP

(57) ABSTRACT

A package delivery system permits the sender to give a package to a carrier well before the desired delivery date. The carrier then stores the package and later delivers the package to the recipient on the date specified by the sender. In particular, the package delivery method involves receiving the package from the sender and having the sender identify the recipient and specify the date on which the package is to be delivered. The carrier then determines whether the sender's request is acceptable. The request is typically considered acceptable when the recipient's address is located within an acceptable delivery area and when the delivery date falls within an acceptable delivery date range. If the request is acceptable, the carrier takes custody of the package and stores the package until it is to be delivered. The package is finally delivered to the recipient on the sender specified delivery date.

24 Claims, 1 Drawing Sheet

DATE SPECIFIC PACKAGE DELIVERY SYSTEM

BACKGROUND OF THE INVENTION

1. Field of the Invention

Figure 1:
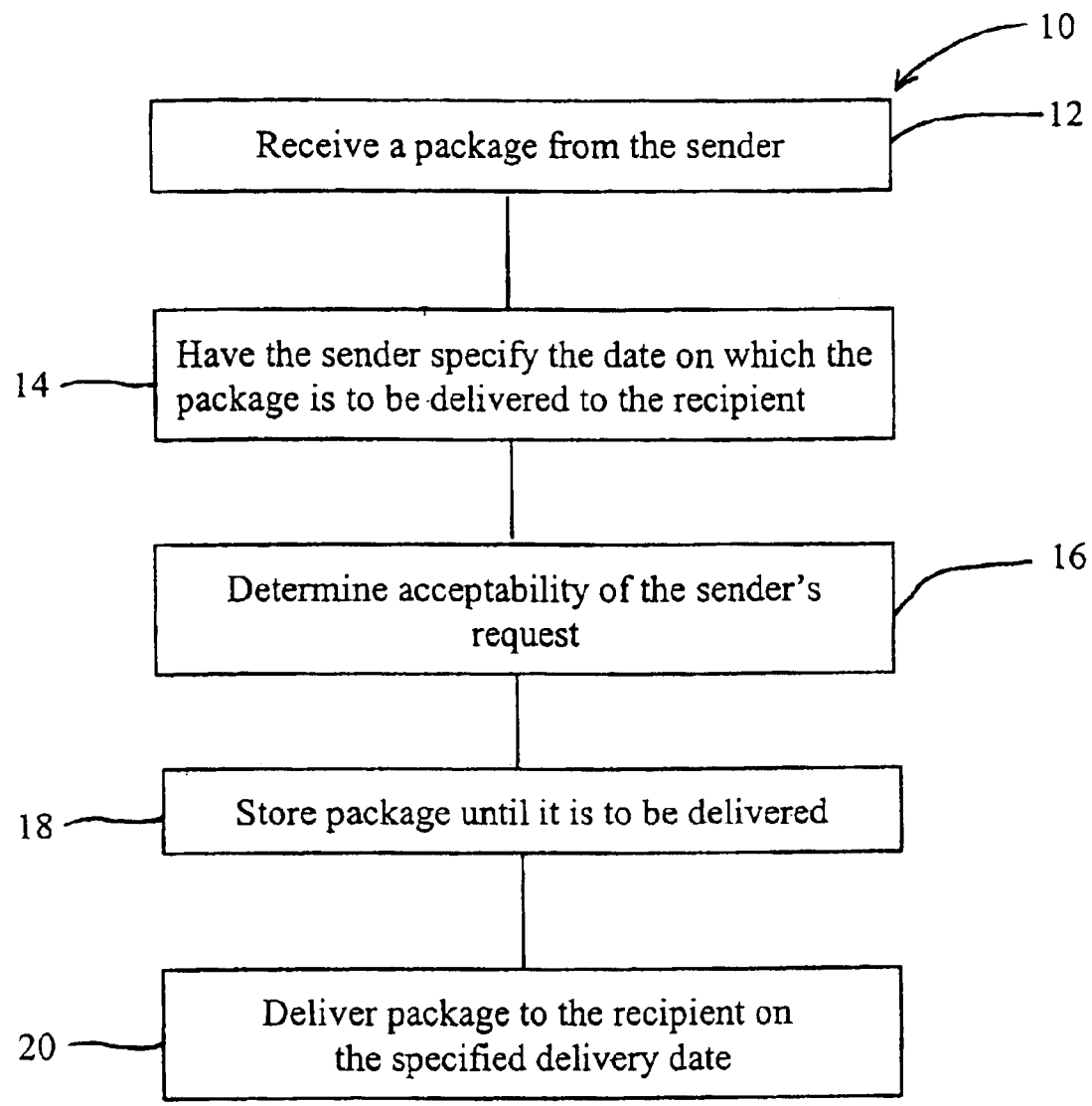

The present invention relates generally to package delivery systems. More specifically, the present invention concerns a package delivery method that involves receiving the package from the sender and then later delivering the package to a recipient on a date specified by the sender.

2. Discussion of Prior Art

It is often desirable to have a package delivered on a specific date. For example, a sender of a package will often desire to have the package delivered on the date of an event (e.g., the recipient's birthday, an anniversary, etc.). However, with traditional package delivery systems, the sender is presented with several problems. For example, the sender must first remember or be alerted of the event just before it occurs. Assuming the sender timely remembers or is notified of the event, he/she must then attempt to coordinate the desired delivery date with the carrier's shipping time. Although traditional priority or express package delivery plans (e.g., overnight or two and three day guaranteed delivery plans) may facilitate delivery on the desired date, these plans tend to be expensive and the sender must still remember the event in such a manner to permit use of an appropriate one of the plans.

OBJECTS AND SUMMARY OF THE INVENTION

Responsive to these and other problems, an important object of the present invention is to provide a package delivery system that ensures delivery of a package on a sender specified date while permitting the sender to give the package to a carrier at his/her convenience. Another important object of the present invention is to provide a date specific package delivery system that can be easily and inexpensively incorporated into existing carrier operations. In this regard, it is an important object of the present invention to provide a date specific package delivery system that generally uses normal, preexisting package delivery systems. It is also an important object of the present invention to provide a date specific package delivery system that is inexpensive and easy to implement and operate.

In accordance with these and other objects evident from the following description of the preferred embodiment, the present invention concerns a date specific package delivery system including the steps of receiving a package from the sender and having the sender specify the date on which the package is to be delivered to the recipient. The system preferably includes the steps of determining whether the sender's request is acceptable (with respect to delivery time and location) and, if the request is acceptable, taking custody of the package. In any case, the package is stored until it is to be delivered to the recipient, and then later delivered to the recipient on the sender specified delivery date. It will be appreciated that the sender may therefore leave the package with the carrier at a convenient time and be assured that the package is delivered to the recipient on the desired date. If desired, the sender could obtain packages for a number of upcoming events, hand over all of the packages at one time and specify the desired delivery date for each package, knowing full well that the each of the packages would be delivered on the specified date.

Other aspects and advantages of the present invention will be apparent from the following detailed description of the preferred embodiment and the accompanying drawing figure.

BRIEF DESCRIPTION OF THE DRAWING FIGURE

A preferred embodiment of the invention is described in detail below with reference to the attached drawing figure, wherein:

FIG. 1 is a flow diagram illustrating the steps of delivering a package in accordance with the principles of the present invention.

DETAILED DESCRIPTION OF THE PREFERRED EMBODIMENT

With respect to FIG. 1, the package delivery method selected for illustration comprises a series of steps, generally referenced by the numeral 10, that are preferably performed in sequence, although the sequence may be varied to some degree as will subsequently be described. Generally speaking, the illustrated method 10 includes step 12 of receiving a package from the sender, step 14 of having the sender specify the date on which the package is to be delivered to the recipient, step 16 of determining the acceptability of the sender's request, step 18 of storing the package until it is to be delivered, and step 20 of delivering the package to the recipient on the date specified by the sender.

The package delivery method 10 is particularly designed for use by a single carrier (e.g., the U.S. Postal Service, a commercial overnight delivery carrier such as "FEDERAL EXPRESS", etc.). However, as will be described, the principles of the present invention are equally applicable to a date specific package delivery system collectively performed by more than one party. For example, one party may be responsible for receiving the package from the sender and accepting the sender's request according to steps 12–16, another party may be responsible for storing the package according to step 18, and yet another party may be responsible for delivering the package according to step 20.

Turning initially to step 12, the package is preferably first received from the sender, although actual taking custody of the package may alternatively be delayed until steps 14 and 16 have been performed. The package may be received from the sender in a number of ways. For example, the sender may deposit the package in person directly with the carrier or the party responsible for assuming custody of the package as part of the delivery system 10. It may alternatively be possible to have the customer purchase the package from a third party (e.g., an online retailer), and the third party then forwards the package to the carrier. In this instance, the sender actually never takes possession of the package but rather it is deposited with the carrier on behalf of the sender by the third party. Furthermore, it will also be appreciated that the third party will preferably advise the carrier on behalf of the sender as to the recipient's address and the date on which the package is to be delivered. Thus, the third party will preferably perform a preliminary review of the sender's request to ensure that it is acceptable with respect to the carrier's specifications. To further accommodate the sender, the carrier may arrange to pick the package up from the sender. For example, the system 10 can be configured so that steps 14 and 16 are performed online and, once the sender has made the online request, the carrier arranges to have the package picked up from the sender. It may alternatively be possible for the sender to have the package picked up and forwarded to the carrier.

Step 14 preferably involves having the sender specify verbally to the carrier the recipient's delivery address and the date on which the package is to be delivered. This of course assumes that the sender is personally communicating with the carrier. The principles of the present invention are therefore equally applicable to performing step 14 by having the sender specify this information for some third party (e.g., an online retailer) who then relays the information on to the carrier or the party responsible for determining the acceptability of the sender's request. It is also possible for the sender to electronically (e.g., via online communication) specify this information.

Once the sender has placed his/her request, the carrier preferably determines the acceptability of the request according to step 16. As previously noted, it may desirable to perform steps 14 and 16 before step 12 so that the carrier does not assume possession or responsibility for the package until the carrier has determined that the package can participate in the inventive package delivery service. It is also noted that step 16 may alternatively be avoided entirely if all locations and delivery dates are considered acceptable (e.g., the carrier delivers to all locations any day of the year). On the other hand, the carrier or party responsible for delivering the package according to step 20 will likely have numerous non-service days. These days may include weekend days, national holidays, etc., and the requested delivery date is compared to any such non-service days to determine the acceptability of the sender's request. Of course, if the specified delivery date falls on a non-service day, the sender will be informed and custody of the package will not be accepted for delivery on that date.

The sender specified delivery date is also preferably compared to an acceptable delivery date range that commences and terminates on designated dates. The start date of the range is designated depending on the date the package is received and the date on which it is to be delivered to the recipient. If these dates are so close that delivery of the package cannot be effected, the sender's request is not acceptable. Designation of the start date for the acceptable range also preferably takes into consideration normal package delivery capabilities. It may be said that normal package delivery requires no storage of the package. For example, if the package can be delivered on the specified date by using conventional package delivery means (e.g., overnight mail, two or three day priority mail, etc.), the specified date is preferably considered unacceptable. It is believed that this avoids intermingling of normal delivery packages and date specific packages until step 20, as will be described, and thereby simplifies the infrastructure needed for implementing and operating the delivery system 10. The preferred acceptable range may alternatively be described as commencing as soon as it is required to store the package (i.e., after any normal delivery dates). It is believed that virtually every normal delivery system will be accommodated by setting the start date to seventy-two (72) hours after receipt of the package. In other words, the sender's request will preferably be considered unacceptable if the desired delivery date is less than seventy-two (72) hours after receipt of the package. Again, the acceptable range also preferably has a termination date. It is believed that having an outside date limit will reduce the number of packages in storage at any given time and thereby simplify and decrease the cost of the infrastructure for implementing and operating the delivery system 10. The termination date of the acceptable range is preferably based on the date the package is received according to step 10. The termination date of the acceptable range is preferably two years. Thus, a package associated with a specified delivery date falling more than two years after the package is received in step 10 will not be taken into custody by the carrier. Of course, the termination date may be varied as desired.

The acceptability of the sender's request is further preferably dependent upon the delivery address of the recipient. That is to say, the specified delivery address is preferably compared to an acceptable delivery area (e.g., the United States, North America, etc.) and, if the former is not located within the latter, the sender will be notified that his/her request is not acceptable.

It is noted that the foregoing determinations involved in step 16 may be computerized if desired. For example, the recipient's address and the desired delivery date may be entered in a computerized system that processes and compares that information to any non-service dates, an acceptable delivery date range and an acceptable delivery area. The sender specified information may be entered by the sender, the carrier or a third party responsible for forwarding the package to the carrier.

If the sender's request is acceptable, the carrier takes custody of the package so that it may be stored according to step 18 and then later delivered according to step 20. Receipt of the package as set forth in step 12 may also be delayed until after step 16 has been performed. Step 16 will also typically involve some sort of payment from the sender, which is preferably required before custody of the package is assumed. Finally, step 16 further preferably involves the step of labeling the package with a package identifier immediately upon taking it into custody. The package identifier may be printed directly on the package or fixed to a label applied to the package, and such labeling may occur manually or automatically. The package identifier is preferably used in a suitable package tracking system so that the whereabouts of the package may be determined at virtually any time. It is noted that the step of labeling the package with a package identifier may be eliminated altogether, as it is only necessary that the package be provided with information identifying the specified delivery date. Furthermore, this step may alternatively form part of step 18 if desired.

With respect to step 18, the package is to be stored once it is taken into custody. It will be appreciated that the term "store" and variations thereof as used herein shall be interpreted to mean holding of the package without the contemporaneous intent to deliver the package. In other words, storage of the package would involve any time that the package is not in actual transit for delivery. This may alternatively be described as any time during which the package would otherwise have to be removed from normal delivery systems and held until delivery could be guaranteed on the specified delivery date. If desired, step 18 may involve a minimum storage time so as to further minimize the risk of premature intermingling of date specific packages with normal delivery packages. Most preferably, step 18 involves no less than a twenty-four (24) hour minimum storage time (i.e., the time during which the package would be removed from a normal delivery system and stored).

In particular, step 18 involves labeling the package with a delivery date identifier that indicates the date on which the package is to be delivered. The delivery date identifier preferably reflects only the date on which the package is to be delivered, whereby all packages to be delivered on the same day have the same delivery date identifier. For example, a package to be delivered on Apr. 3, 2001 will have a date identifier that itself identifies this date without reference to a package tracking number, and all packages to be delivered on this date have the identical date identifier. Although the date identifier may readily be discernible by a person, the preferred date identifier is particularly adapted for automatic reading and detection by a suitable identifier-reading aid. The date identifier is most preferably bar coding, and a standard bar code reader may therefore be employed to read the date on which the package is to be delivered. However, other suitable identifiers and reading devices may be used (e.g., an RFID tag and standard reading device). It will be appreciated that the preferred bar coding may be printed directly onto the package or applied to an adhesive label adhered to the package.

The date identifier may itself serve to identify the package as a date specific package, although a label specifically identifying the package as a date specific package is preferred. The date specific package identifier is preferably common to all date specific packages and is also preferably machine readable. The delivery date and date specific package identifiers are preferably simultaneously applied to the package. In addition, these identifiers may be in lieu of the package identifier (described above) or in addition thereto. Those ordinarily skilled in the art will appreciate that a single bar code may serve as all three identifiers. It is noted, however, that the date specific package identifier is preferably not only machine readable but also readily discernable by the naked eye so that the package can quickly be identified by a person as a date specific package.

The identifiers are particularly useful in expediting the sorting of date specific packages from normal delivery packages and the grouping of date specific packages according to the specified delivery date. That is, step 18 preferably involves separating the date specific package from normal delivery packages and grouping the package with any other date specific packages to be delivered on the same date. The use of the preferred machine readable identifiers significantly facilitates sorting of the packages. Moreover, suitable sorting and bundling equipment may be used with the identifier reading devices to automate this process. Those ordinarily skilled in the art will appreciate that sorting of the package from normal delivery packages may occur immediately upon taking custody of the package (e.g., by the worker simply depositing the different packages in separate bins). Grouping of the date specific packages according to delivery date preferably occurs shortly thereafter so that the package is stored in a group or bundle with other packages to be delivered on the same date. However, it is entirely within the ambit of the present invention to alternatively store the package and then later group the package with other packages to be delivered on the same day.

During step 18, the package is preferably shipped to a local storage hub proximal to the recipient's delivery address. Of course, if the sender happened to deposit the package with the hub proximal to the recipient, shipment of the package is not necessary. In that case, storage will preferably take place at the hub at which the package was deposited. The location of local storage hubs will likely be determined by the quantity of date specific packages sent to a given area. For example, some metropolitan areas may require more than one storage hub while others may require more. Step 18 also preferably involves use of a centralized storage facility for long term storage of date specific packages. In this regard, date specific packages which require storage for a significantly long period of time (e.g., six months to two years) may first be stored in a regional centralized storage facility and then later shipped to a local storage hub as the delivery date approaches. Such centralized storage of a date specific package will also likely involve grouping of date specific packages by the centralized storage facility and further by the local storage hub. Again, the system 10 will preferably be computerized so that, once the desired delivery date and the recipient's address are entered, the system will determine if the package should be sorted for temporary storage at a centralized storage facility and which of the facilities encompasses the local storage hub corresponding to the recipient's address. Storage at the centralized storage facility and the local storage hub may be performed by the same party or separate parties, and yet another party may be responsible for shipping the package from the centralized facility to the local hub. However, as previously indicated, a single carrier is most preferably responsible for all of step 18. It is also possible for a centralized storage facility to serve as the local storage hub for the area in which it is located.

Those ordinarily skilled in the art will appreciate that the storage of packages will likely be the most expensive aspect of the system 10. Therefore, it may be necessary to limit the weight and/or the size of packages that qualify for participation in the system 10.

Step 18 also preferably involves alerting the carrier of the presence of the package and the date on which the package is to be delivered to the recipient. This may be accomplished manually simply by ordering the preferred bundles of packages (grouped by delivery date) according to the upcoming dates. Most preferably, each package has been entered into the package tracking system so that the package may be individually accounted for and located within the system. The tracking system include a "tickler" for alerting the carrier so that the package is delivered accordingly.

Upon being alerted by the system, the carrier effects delivery of the package to the recipient according to step 20. If the local storage hub technique has been employed, then the hub preferably performs this step. The package is retrieved from storage and then preferably sorted along with other packages according to delivery addresses. In fact, the package is preferably incorporated into the local/normal delivery service for delivery with normal delivery packages on the known service day (e.g., the same day as or the next day after sorting). The local delivery service, which is preferably the carrier implementing and operating the system 10, consequently performs step 20. The step of sorting the date specific packages by delivery address is preferably done during delivery step 20, although it may alternatively be performed during the storage step 18, particularly if the date specific packages are delivered separate from normal delivery packages. It is also noted that the principles of the present invention are equally applicable to a system involving delivery of the package by a party other than that responsible for storing the package according to step 18. For example, the storage hub may alternatively transfer the package to a delivery service (e.g., a same day or overnight delivery service) for effecting step 20.

The use of the system 10 disclosed herein should be apparent from the foregoing description. Thus, it shall be sufficient to explain that the system 10 preferably involves receiving the package from sender according to step 12. The package may consist of an envelope or a larger item (e.g., a box), although it may be necessary for the carrier to limit the size and/or the weight of the package. Step 14 is performed essentially simultaneously or before or after step 12 by having the sender specify the date on which the package is to be delivered and the recipient's delivery address. As set forth in step 16, the carrier then determines the acceptability of the sender's request. If the request is acceptable and once the sender pays the appropriate delivery charge, the package is taken into custody. It is particularly noted that the delivery charge will likely vary depending on package size and weight. It may also be necessary at this time to remind the sender that no perishables should be contained within the package. Once the package is properly deposited with the carrier, the package is stored according to step 18. Finally, step 20 is performed by delivering the package to the recipient on the specified delivery date. The sender may therefore deposit a package(s) at his/her convenience with the carrier, or request by phone or with an online retailer who utilizes this date specific delivery system, and rest assured that the package(s) will be delivered on the desired date(s).

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of the present invention as pertains to any apparatus not materially departing from but outside the literal scope of the invention as set forth in the following claims.

What is claimed is:

1. A package delivery process for use by a carrier, said package delivery process comprising the steps of:
    utilizing a carrier specified delivery date subsystem for delivering packages to recipients wherein the carrier provides at least one predetermined carrier specified delivery schedule in which a package will be delivered to a recipient according to that schedule upon receipt of the package from a sender, said carrier specified delivery date subsystem including the steps of:
    (1a) receiving a plurality of packages from a plurality of senders; and
    (1b) delivering each of the package to a respective one of the recipients according to the carrier specified delivery schedule; and
    utilizing a sender specified delivery date subsystem for delivering an additional package to an additional recipient on a sender specified delivery date, said sender specified delivery date subsystem including the steps of:
    (2a) receiving the additional package from an additional sender, wherein the additional package is to be delivered in a different time frame than said at least one carrier specified delivery schedule;
    (2b) having the additional sender specify the sender specified delivery date on which the additional package is to be delivered to the additional recipient, wherein said sender specified delivery date falls outside of the time frame of said at least one carrier specified delivery schedule;
    (2c) after step (2b), storing the additional package until the sender specified delivery date falls within the time frame of said at least one carrier specified delivery schedule, and including the step of alerting a party responsible for storing the additional package of the presence of the additional package and the sender specified delivery date; and
    (2d) after step (2c), incorporating the additional package into the carrier specified delivery date subsystem such that the additional package is delivered to the additional recipient on the sender specified delivery date, and including the step of sorting the additional package and the plurality of packages according to delivery address.

2. A package delivery process as claimed in claim 1, step (2a) including the steps of having the additional sender purchase the additional package from a seller without the additional sender receiving the additional package from the seller, and forwarding the purchased additional package from the seller to the carrier.

3. A package delivery process as claimed in claim 1, step (2a) including the step of picking the additional package up from the additional sender.

4. A package delivery process as claimed in claim 1, step (2b) including the step of having the additional sender specify the additional recipient's address.

5. A package delivery process as claimed in claim 1; and (2e) determining the acceptability of the additional sender's sender specified delivery date and then, if the sender specified delivery date is acceptable, performing step (2a).

6. A package delivery process as claimed in claim 5, step (2e) including the step of comparing the sender specified delivery date to any non-service dates.

7. A package delivery process as claimed in claim 5, step (2e) including the step of comparing the sender specified delivery date to an acceptable delivery date range.

8. A package delivery process as claimed in claim 7, step (2e) including the step of determining whether the sender specified delivery date falls within the acceptable range which commences outside any predetermined carrier specified delivery schedule and terminates two years after the date on which the additional package is received.

9. A package delivery process as claimed in claim 5, step (2e) including the step of determining whether the additional recipient's address is located within an acceptable delivery area.

10. A package delivery process as claimed in claim 5, step (2e) including the step of entering in a package tracking system a package identifier specific to the additional package.

11. A package delivery process as claimed in claim 5, if the additional sender's specified delivery date is acceptable, step (2c) including the step of labeling the additional package with a delivery date identifier, wherein all packages to be delivered on the same delivery date have the same delivery date identifier.

12. A package delivery process as claimed in claim 11, step (2c) including the step of applying bar coding to the additional package.

13. A package delivery process as claimed in claim 11, step (2c) including the step of labeling the additional package with a date specific package identifier that identifies the additional package as a date specific package, wherein all date specific packages have the same date specific package identifier.

14. A package delivery process as claimed in claim 1, step (2c) including the step of labeling the additional package with a delivery date identifier, wherein all packages to be delivered on the same delivery date have the same delivery date identifier.

15. A package delivery process as claimed in claim 1, step (2c) including the step of applying bar coding to the additional package.

16. A package delivery process as claimed in claim 1, step (2c) including the step of sorting the additional package and any other date specific packages according to their specified delivery dates.

17. A package delivery process as claimed in claim 16, step (2c) including the step of storing the additional package after the additional package has been sorted.

18. A package delivery process as claimed in claim 16,
step (2c) including the step of labeling the additional package with a delivery date identifier, wherein all date specific packages to be delivered on the same delivery date have the same delivery date identifier,
step (2c) including the step of reading the delivery date identifier.

19. A package delivery process as claimed in claim 1,
step (2c) including the step of shipping the additional package to a local storage hub proximal to the additional recipient.

20. A package delivery process as claimed in claim 19,
step (2c) including the step of temporarily storing the additional package at a centralized storage facility before the additional package is shipped to the local storage hub.

21. A package delivery process as claimed in claim 19,
steps (2c) and (2d) being performed at the local storage hub.

22. The package delivery process as claimed in claim 1,
step (2c) including the step of separating the additional package from the plurality of packages.

23. The package delivery process as claimed in claim 22,
step (2c) further including the step of removing the additional package from the plurality of packages for a minimum time period of at least about twenty-four hours.

24. A package delivery process as claimed in claim 23,
said minimum time period being at least about forty-eight hours.

* * * * *